Figure 11:
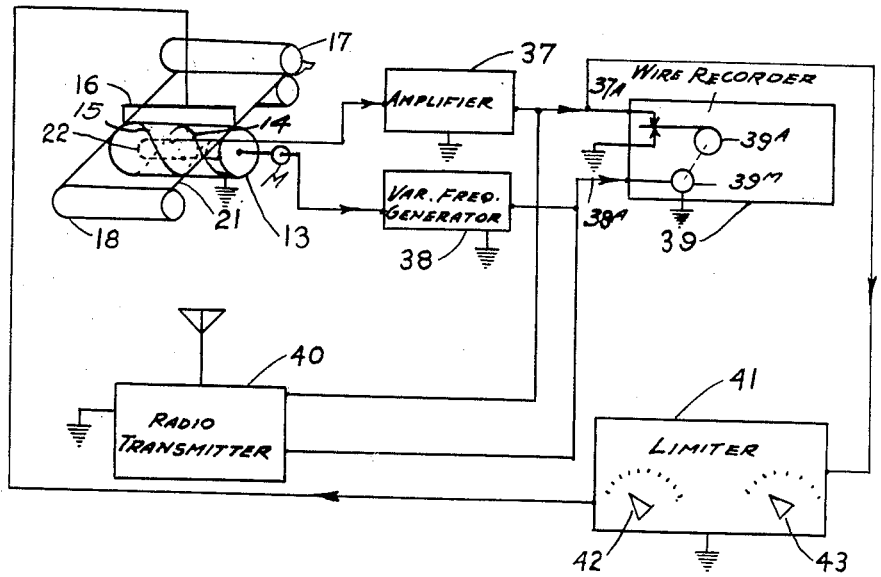

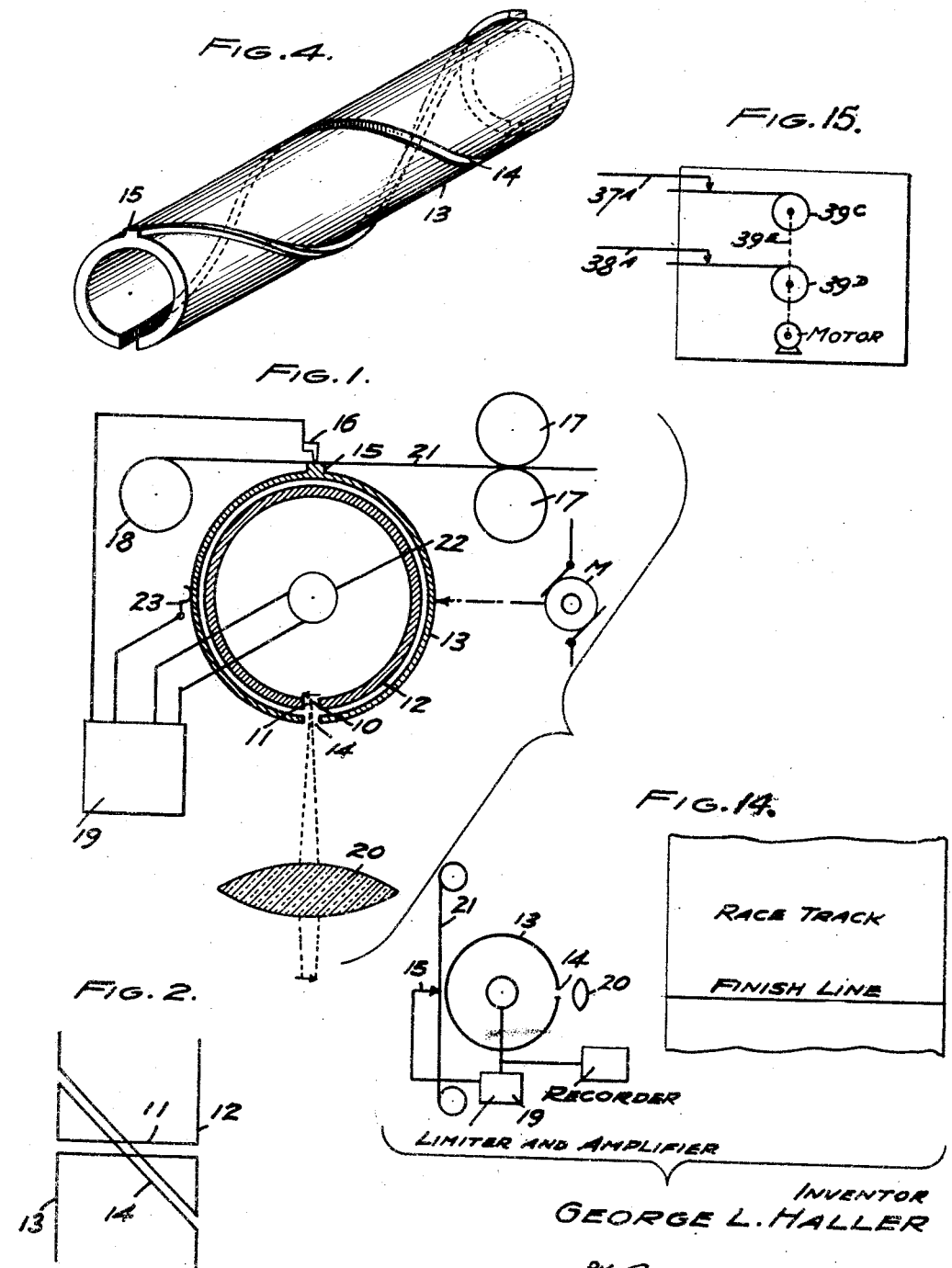

May 31, 1955
G. L. HALLER
2,709,716
CONTRAST ENHANCING AERIAL PHOTOGRAPHY
Filed Oct. 19, 1948
4 Sheets-Sheet 2
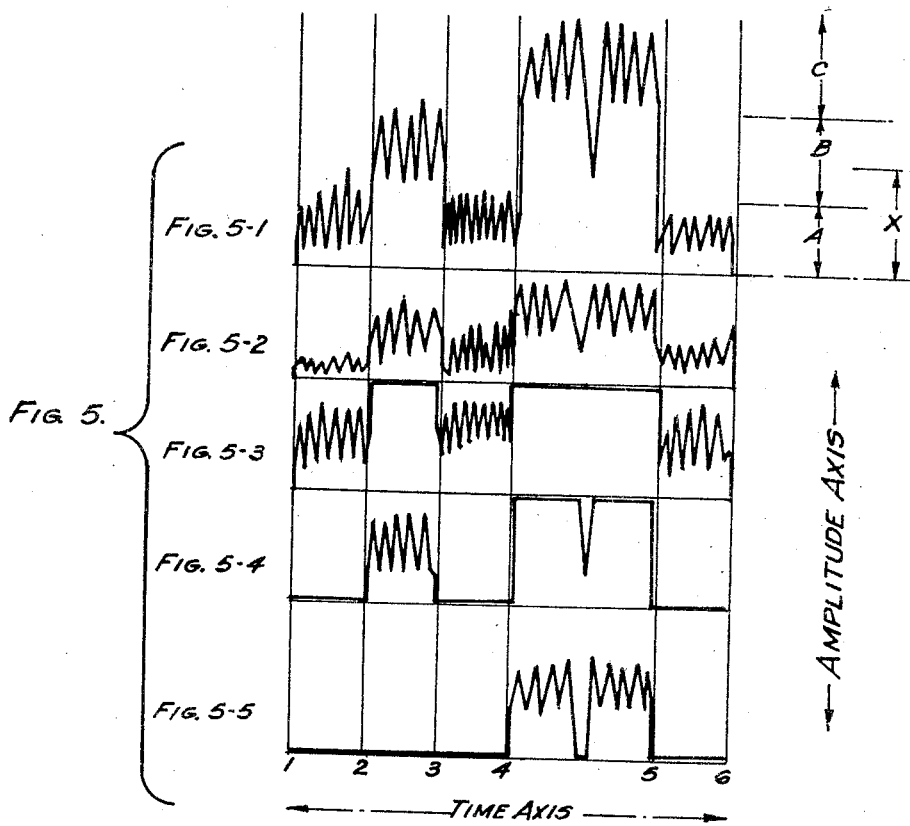
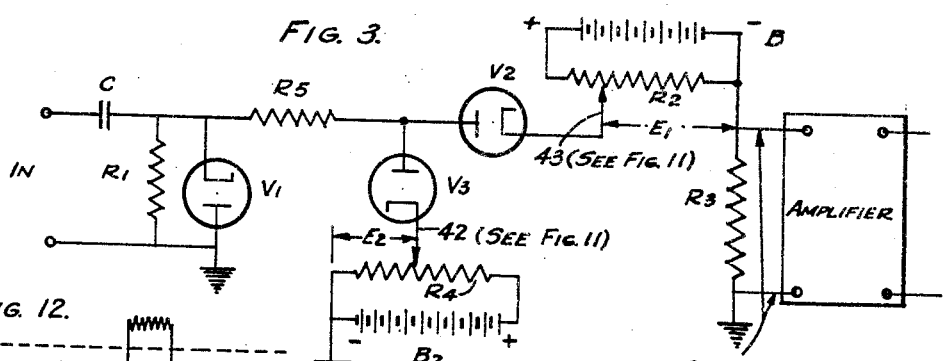
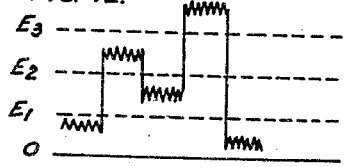
INVENTOR
GEORGE L. HALLER
BY Moore & Hall
ATTORNEYS May 31, 1955   G. L. HALLER   2,709,716
CONTRAST ENHANCING AERIAL PHOTOGRAPHY
Filed Oct. 19, 1948   4 Sheets-Sheet 3
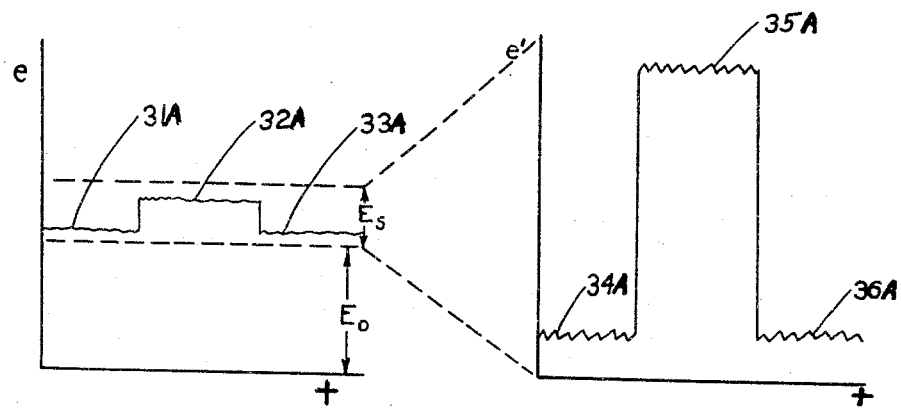
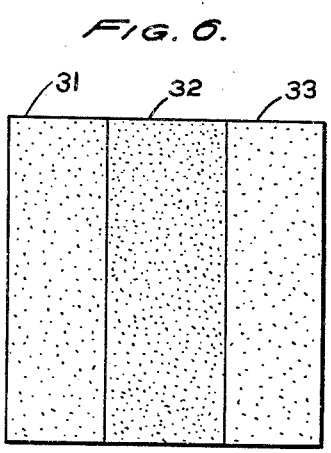
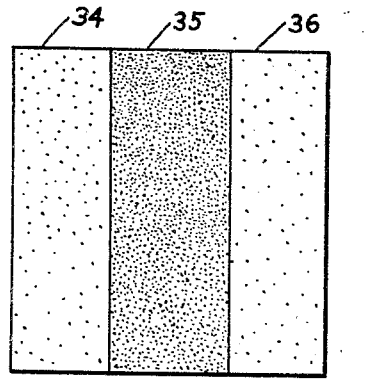
INVENTOR.
GEORGE L. HALLER
BY
Moore and Hall.
ATTORNEYS May 31, 1955 G. L. HALLER 2,709,716
CONTRAST ENHANCING AERIAL PHOTOGRAPHY
Filed Oct. 19, 1948 4 Sheets-Sheet 4

INVENTOR.
GEORGE L. HALLER
BY
Moore and Hall
ATTORNEYS

United States Patent Office 2,709,716
Patented May 31, 1955

2,709,716

CONTRAST ENHANCING AERIAL PHOTOGRAPHY

George L. Haller, State College, Pa.

Application October 19, 1948, Serial No. 55,389

11 Claims. (Cl. 178—6.6)

This invention relates to photography and more particularly to aerial photography, and has for an object the provision of a system for photographing which prints the picture instantaneously. The picture may be produced locally or at a remote point, or both, simultaneously with the act of photographing it.

Another object of the invention is the provision of an aerial photographic system that is simpler and produces a picture faster than prior systems. Still other objects are (a) the provision of a system capable of printing a picture with improved contrast, (b) the provision of a system capable of reproducing the picture on the ground instantaneously with the photographing of the terrain from the aircraft, (c) the provision of a system for aggravating or creating contrast between objects which are of quite similar color, (d) the provision of a system capable of aggravating or creating contrast between two objects and their respective backgrounds even though the backgrounds are widely different so far as their colors and light emitting characteristics are concerned, (e) the provision of a system capable of producing a picture, at the pilot's position, of the terrain, either ahead of or over which, he is flying, (f) the provision of a system that will make a full record of maximum range of contrast, which record can promptly be analyzed, and (g) the provision of a system for recording various frequencies of light emanating from or reflected by the objects being photographed. Other objects and advantages will appear as this description proceeds.

It is often desirable to photograph the terrain from an aircraft. Frequently, parts of the terrain which it is desired to have stand out on the photograph are camouflaged and have a very slight difference in appearance from surrounding objects. Ordinary photographs will not distinguish such parts from their background. If the ordinary photographic negative is exposed so as to effect maximum contrast between certain parts of the terrain it will not be properly exposed to effect maximum contrast between other parts of the terrain. Furthermore, ordinary negatives can not be instantly developed, and cannot be readily relayed to remote ground stations. As will appear from the following brief description and later on from a highly detailed description, my invention overcomes the aforesaid disadvantages of the prior art.

I will at this point make a brief description of the preferred form and use of the invention, it being understood that the scope thereof is defined in the claims. The invention contemplates scanning the terrain by admitting light from only a limited increment, or spot, of the terrain at any one time. A photoelectric cell receives the increments of light. The increments or spot of lights are preferably selected along a line which is preferably substantially perpendicular to the path of flight. The forward motion of the aircraft causes the apparatus to pass on from the line originally scanned to a new line which is scanned. Eventually a series of substantially parallel lines, which are along and substantially perpendicular to the path of flight, are scanned. The photoelectric cell has an output wave varying with the incremental intensities along the scanning path. The variations in incremental intensities are applied to electrodes which are arranged to print a picture by passing current through chemically treated paper. The paper is caused to move relative to the electrodes in a first direction at a speed proportional to the ground speed of the aircraft and in a direction perpendicular to the first direction in synchronism with the scanning.

The aforesaid output wave is in the form of a pulsating uni-directional current having its deepest valley corresponding to the minimum light intensity received from the terrain photographed during the scanning. The resulting picture will have improved contrast if the output wave is passed through a limiter before being applied to the electrodes. This will be described in detail later.

A portion of terrain to be photographed may have a bright object in a bright background adjacent a dull object in a dull background. With my invention either or both of these may be made to appear clearly with only one exposure. If it is desired to photograph only the bright object, the limiter may be adjusted to remove all of the aforesaid output waves below the minimum valley of the bright area. This will cause the bright object to show up with considerable contrast to its bright background. Since it is not always possible to predict the amplitude of the minimum valley in advance, the output of the cell may be recorded on a magnetic or other recorder. The recorder is played back several times and the output thereof fed to the limiter and thence to the electrodes. During the period of the first play-back the limiter may have one adjustment to thereby bring out contrast of bright objects with bright backgrounds, and during the second play-back the limiter may have another adjustment to thereby bring out contrast between dull objects and dull backgrounds. By use of the principles of trial and error, the maximum contrast of particular parts may be effected. As a result, even though there is but one exposure of the terrain photographed, pictures bringing out widely different types of contrasts may be made. Furthermore, by adjusting the limiter while the printing operation is in progress a single picture with different contrasts may be produced.

The output of the cell may be relayed by radio to remote receiving stations where the picture may be instaneously printed or recorded. All of the limiting and recording features for bringing out contrasts may be utilized at the ground station. If the cell output is recorded while being transmitted, it is not necessary to retake the entire picture if interference should prevent the receiving station from getting a complete picture, since the aircraft can play-back that portion of the picture that was interrupted.

Figure 10:
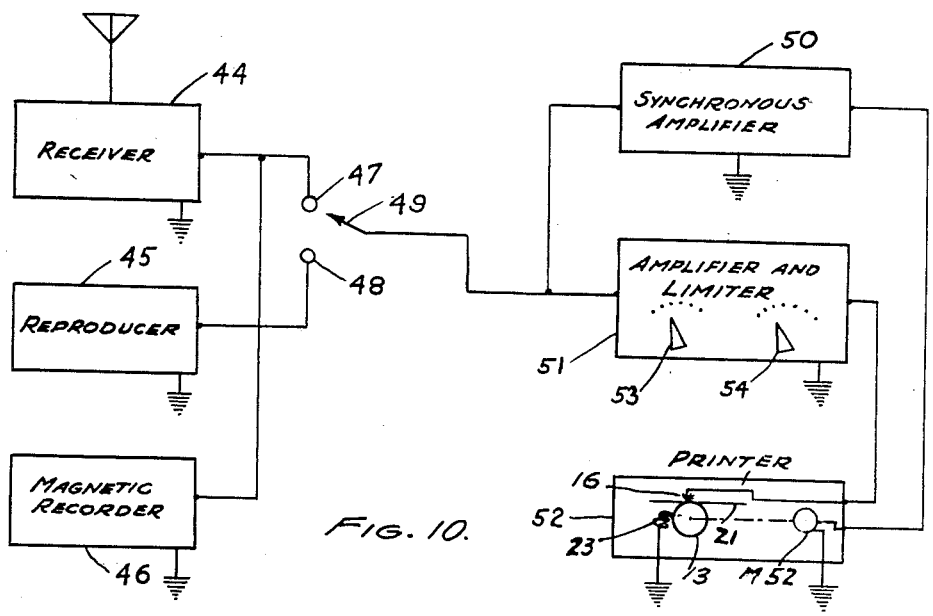

In the drawings, Figure 1 is a schematic drawing of the apparatus employed in connection with a simplified form of the invention. Figure 2 is a developed view of the two cylinders of Figure 1. Figure 3 illustrates by a schematic diagram one possible form of the amplifier and limiter of Figures 1 and 11. Figure 4 is a perspective view of the outer cylinder of Figure 1. Figure 5 illustrates the wave form of the output of the photoelectric cell of Figure 1 for a particular terrain hereinafter discussed. Figure 6 illustrates a picture printed (of a section of terrain having three parallel bands of which the outer bands are dark and the central band is light in color) by the apparatus without the benefit of the limiter. Figure 7 illustrates the same picture printed with the benefit of the limiter. Figure 8 shows the relationship of the cell output voltage for one scanning operation of the terrain pictured in Figure 6. Figure 9 illustrates the same cell output voltage after being passed through the amplifier and limiter used as one element of my combination. Figure 10 is a block diagram of a complete ground receiving station adapted to remotely record the terrain photographed by an aircraft. Figure 11 is a block diagram of a complete photographing and transmitting station adapted to be used aboard aircraft. Figure 12 shows an illustrative input to the limiter of Figure 3, and Figure 13 illustrates the output of the limiter when the input wave of Figure 12 is applied. Figure 14 shows an alternate application of certain of the features of the invention. Figure 15 illustrates an alternate form of recorder for use in connection with Figure 11.

Referring to Figure 1 it is noted that all of the apparatus in this figure is adapted to be mounted aboard a fast moving airplane which is moving toward the right. The image of the terrain below is focussed by lens 20, on a plane that contains slit 10. The slit 10 is located in outer metal rotating cylinder 13. There is also a stationary inner cylinder 12 concentric with the outer one and closely spaced therefrom. The spacing between the cylinders is not critical and normally would be quite small. Located concentric with both cylinders is a photoelectric cell 22, the output of which is fed to the amplifier and limiter box 19. The light signal need not be impinged directly on the cell but since the inside of the cylinder 12 has a mirror surface any light entering the slit 10 will illuminate the cell indirectly. One side of the amplified potential difference from box 19 is applied to brush 23 which touches the outer metal cylinder 13 which cylinder acts as a slip ring. The outer cylinder 13 has a raised metal electrode 15 hereinafter described. The other side of the output potential difference of box 19 is applied to electrode 16. A strip of chemically treated paper 21 from roll 18 passes between the electrodes 15 and 16. The paper 21 is of a type similar to that well known in facsimile work. The variable speed motor M drives the cylinder 13 which in turn drives the paper by virtue of the pressure between electrodes 15 and 16. Hence, the paper 21 is caused to move at a rate proportional to the movement of the photographic equipment over the terrain being photographed.

The scanning means will now be described. It includes the inner stationary cylinder 12 having a straight slot 11 running parallel to the axis thereof. The outer cylinder 13 has a helical shaped slot 14. Spaced at all points by exactly 180 degrees around the periphery from the slot 14, is a raised metal electrode 15 which is also of helical shape.

Figure 2 is a developed view of the cylinders 12 and 13 and shows that the slot 11 crosses the slot 14 at one point only. As the outer cylinder 13 rotates, the intersection of the slots repeatedly moves along the slot 11 (parallel to the axis of the cylinders). Hence, the increment of terrain scanned moves along a path approximately perpendicular to the path of travel of the aircraft. The electrode 15 likewise touches the paper 21 along a path approximately perpendicular to the path of travel of the aircraft. Hence, the electrode 15 always touches the paper 21 at a point complementary to the increment of terrain focused on the cell 22.

Assume that the airplane is passing over a section of terrain that is bright in color throughout the entire path of the plane, and has dark bands on both the right and left sides of the craft. The output of the photoelectric cell would have a wave form such as is shown in Figure 8. The slot 14 scans a path which moves across and is perpendicular to the three bands 31, 32 and 33 of Figure 6, and while the scanning path is passing through band 31 the cell output has a voltage 31A (see Figure 8). While the scanning path is passing through band 32 the output voltage is 32A, and while the scanning path is passing through band 33, the output voltage is 33A. Due to the general background level of voltage $E_0$, the percentage difference between voltages 31A and 32A is not great. Hence, if the output of the cell were amplified by ordinary amplification systems and applied to electrodes 15 and 16, the potential difference across electrodes 15 and 16 would not vary by a large percentage when the scanning path moved from band 31 to band 32. The resulting picture would vary in intensity substantially in proportion to the changes in brilliance of the terrain photographed. Hence, the picture would be a fairly true picture, but this is not always desired.

By employing in Figure 1 an amplifier and limiter 19, constructed as shown in Figures 3 and 14, the voltage $E_0$ may be removed. Hence, the voltage 34A is increased many fold to a value equal to voltage 35A when the scanning path passes into the central band. Therefore, the outer dark bands of the terrain produce low voltages 34A and 36A and the very pale picture bands 34 and 36, whereas the bright middle band of terrain produces a comparatively large voltage 35A and a comparatively dark central picture band 35. By adjusting the limiting action it is possible to develop large contrasts on the picture when the actual contrast is quite small. Hence, it is possible to accentuate the contrast of objects intentionally camouflaged, and cause them to stand out to a much greater extent than has been heretofore possible.

Figure 3 shows a circuit which includes an upper and lower clipper to provide amplitude division of the signal. The circuit employs as its principal components two biased diode tubes $V_2$ and $V_3$. The input signal is applied through coupling capacitor C which is desirable in most practical applications to prevent the appearance of direct voltages at undesired points in the circuit. Clamping diode $V_1$ in cooperation with its load resistor $R_1$ establishes a reference level of the signal causing the most negative portion of the signal to assume ground potential and other original portions to be correspondingly disposed with respect to ground. Biased diode $V_2$ sets the threshold level of the signal as determined by its bias voltage $E_1$ which is derived from a battery $B_1$ and adjustable resistor $R_2$. An input signal amplitude less than $E_1$ will result in no current flow in load resistor $R_3$ because the positive bias applied by $E_1$ to the cathode of diode $V_2$ will prevent current flow through the diode. Hence no output signal will be developed. When the input signal rises above the level of $E_1$ however, as shown in Figure 12 and as indicated in times 2—3 and 4—5 of Figure 5 (hereinafter explained) then current will flow through diode $V_2$ and an output voltage will be developed.

Diode $V_3$ is a clipping diode which establishes the upper limit of the selected signal amplitude range by means of its bias voltage $E_2$ which is derived from battery $B_2$ and adjustable resistor $R_4$. Since the cathode of diode $V_3$ is biased positively no current will flow through diode $V_3$ until the amplitude of the signal at its plate exceeds $E_2$ which of course is greater than $E_1$. When this occurs diode $V_3$ conducts applying a low shunt resistance to the circuit and causing the signal to appear across series resistor $R_5$ rather than the load resistor $R_3$. This action is apparent in Figure 13 (which shows the output of the device of Figure 3 when the input voltage shown in Figure 12 is applied) and also in Figure 5—4.

The threshold and clipping levels may be varied by adjustment of $R_2$ and $R_4$ respectively. If desired, control shafts for these resistors could be ganged resulting in a fixed difference between threshold and clipping levels which could be adjusted to any position on the amplitude scale.

Certain additional effects and utilities of the circuit of Figure 3 will now be explained in greater detail by reference to Figure 5. Figure 5—1 illustrates a wave produced by the photoelectric cell (after linear amplification and without any limiter) due to one scan across a given section of terrain. For purposes of identification the time axis is identified by times 1—2, 2—3, 3—4, 4—5, and 5—6. In Figure 5—1 the potential X represents the maximum voltage output that is permissible for proper printing of the picture. Therefore, in Figure 5–1, the portion of the scans in times 1—2, 3—4, and 5—6 will be properly printed but the portions in times 2—3 and 4—5 will not. Of course, instead of using the limiter 19, the amplification of the voltage output wave could be reduced somewhat in which event the new wave would be similar in shape to that of Figure 5–1. Such a wave is shown in Figure 5–2. It is obvious that if we were to print the wave of Figure 5–2 that the details in the low intensity time areas 1—2, 3—4 and 5—6 would not be reproduced with the same clarity as in the case of the greater amplification contemplated in connection with Figure 5–1. In event there is no interest whatsoever in the details of the high intensity areas, we can adjust the limiters of Figure 3 to amplify the low intensity areas and to clip off the high intensity currents. The purpose of clipping off the high intensity currents is to prevent the heavier currents from making such brilliant marks on the paper as to interfere with the details printed in adjacent low intensity areas. By adjusting the rheostat arm 42, the limiter of Figure 3, can be arranged to clip off everything above potential X. If tthe terrain referred to in connection with Figure 5–1 is scanned with the limiter of Figure 3 in action, the resulting output wave appears in Figure 5–3. The low intensity areas are highly amplified, whereas the high intensity areas are clipped. Referring back now to Figure 5–1, if it is desired to print only the terrain in the medium intensity area marked B, the limiter rheostat 43 (see Figure 3) can be set for the lower limit of range B and the rheostat 42 can be set for the upper limit of the range B. If this is done, the output wave of the limiter will have the shape of Figure 5–4. In event it is desired to print only the very bright range (marked C in Figure 5–1), the rheostats 42 and 43 would be adjusted to comprehend range C. Figure 5–5 shows the output of the limiter with this adjustment.

Referring now to Figure 11 we see a complete photographing, recording, and printing station, as well as one that can broadcast sufficient intelligence that the ground station of Figure 10 can reproduce the picture. The parts 13, 16, 17, 18, 21, and 22 of Figure 11 are identical with like-numbered parts of Figure 1. The output of cell 22 is amplified by amplifier 37 and fed into recorder 39. The speed of recording is synchronized with the speed of outer cylinder 14 by synchronizing device 38. An example of a way of synchronizing the recorder 39 with the cylinder 13 is to drive both the cylinder 13 and the recorder 39 by synchronous motors respectively which are driven by variable frequency generator 38. The synchronous motor M therefore drives cylinder 13 at a speed directly proportional to the speed at which synchronous motor 39M drives the wire recorder 39A. The output of amplifier 37 is also fed to limiter 41 (similar to the limiter of Figure 3) which has a threshold control 43 and a contrast control 42. The output of limiter 41 is fed to electrodes 15 and 16 so that a picture is printed aboard the aircraft. The output of amplifier 37 is also fed to radio transmitter 40 and is arranged to modulate that transmitter in any well known way. The frequency of variable frequency generator 38 is also fed to the transmitter and modulates the same. If the frequency of 38 is sufficiently close to that of the output of 37 that the modulations cannot be readily separated by filtering then two transmitters 40 (respectively modulated by the amplifier 37 and the generator 38) and two receivers 44 should be used.

At the receiving station of Figure 10, which may be on another airplane or on the ground, the receiver 44 picks up the waves from transmitter 40. The receiver 44 output is demodulated and contains two modulation waves which are separated in the usual manner. One of these modulation components corresponds to the variations introduced by amplifier 37 of Figure 11, and the other modulation component corresponds to the frequency of the variable frequency generator 38 of Figure 11. The latter modulation component is fed to synchronous amplifier 50 and thence to a synchronous motor M52 which drives the map printer 52. The map printer 52 is similar to the parts 13, 15, 16, 17, 18, and 23 of Figure 1, with motor M52 of Figure 10 corresponding to motor M of Figure 1. The output of the amplifier and limiter 51 is impressed between parts 16 and 23 of Figure 10.

When the aircraft is passing over the terrain being photographed, the cylinder 13 of Figure 10 is rotating synchronously with that of Figure 11. Moreover, the potential impressed between electrodes 16 and 23 of Figure 10 is varying in proportion to that potential between 16 and 13 of Figure 11. The result is that for similar settings of the limiters of Figures 1, 10 and 11, the potential differences impressed on the papers 21 in each figure will be similar and the relative motions of the electrodes with respect to the paper will be the same. Hence, similar pictures will be printed.

If the operator at the ground station of Figure 11 fails to receive part of the picture, he can ask the operator of the aircraft station to utilize his recorder 39 and play back that part of the picture. During this play back it is not absolutely necessary to utilize means to insure that motor 39M rotates at the speed that it did during the recording since it can be adjusted approximately by estimating the speed of the same from an inspection of the printed map 21.

In Figure 11, the recorder 39 is connected to amplifier 37 and to the generator 38 by wires 37A and 38A respectively. The alternate form of recorder illustrated in Figure 15 may also connect to wires 37A and 38A. It has two magnetic recorders 39C and 39D driven by a motor. In this form the motor need not be synchronized as to speed since it drives the magnetic recorders 39C and 39D at proportional speeds, the recorders being driven by the same shaft 39E. Recorder 39C records the output of amplifier 37 and recorder 39D records the frequency of generator 38. When the recorders 39C and 39D of Figure 15 are "played-back" each is, of course, again rotated at the same speed as the other one is rotated. Hence, the synchronizing current emitted to wire 38A will when transmitted by transmitter 40 operate motor M52 at the proper frequency to truly record the output current fed to wire 37A.

At the ground station of Figure 10, the modulation components may be recorded on magnetic recorder 46. After the recording, the same may be played back by reproducer 45 several times with different adjustments of the controls 53 and 54. These adjustments may be so selected as to produce the desired contrast and in accordance with the principles fully discussed in connection with Figure 5. When it is desired to photograph two closely adjacent objects of different contrast with respect to their backgrounds from a moving aircraft, the apparatus of Figures 10 and 11 may be used, as follows. The terrain is photographed in the usual way and the resulting electrical potential recorded by the wire recorders 39 and/or 46. The recording is twice played back. Two pictures are printed by the printer 13 and/or 52, as the case may be, from the played-back recordings. During one playback the rheostat 43 (Figure 3) may be set so that the value $E_0$ is just below the lowest valley of that portion of the wave representative of the first object (and its background) and during another playback the rheostat 43 may be adjusted so that the value $E_0$ is just below the lowest valley of that portion of the wave representative of the second object and its background. Hence, the first picture will clearly show a contrast between the first object and its background and the second picture will clearly show a contrast between the second object and its background.

It is also noted that during the making of any given picture, the rheostat 43 may be varied from time to time so as to keep the value $E_0$ of Figure 8 below the minimum potential of the generated electrical wave.

This invention has its most important novelty and concept of invention in that it provides solutions to problems of aircraft photography that have long faced those skilled in the art. There are some of the aspects of the invention that are not limited to aircraft photography. The appended claims clearly show the features that because of their peculiar utility to aircraft photography are limited thereto, and the claims will also clearly show those features not limited to aerial photography. However, I will show how certain of the patentable features may be applied to things other than aircraft photography.

Figure 14 illustrates the utility of certain features of the invention as applied to recording the results at the finish line of a race track. The cylinder arrangement 13 and the parts mechanically associated with it are similar to the parts of Figure 1. The cylinder 13 is so mounted that slit 10 is vertical and is facing the finish line directly. The lens 20 is arranged to focus the finish line on the plane of slit 10. As the several runners pass by, the apparatus will photograph them and cause them to appear on the picture in the same order as they crossed the finish line. In a very close race, something more than this is necessary since the race is decided by determining which runner first contacted the small string which extends across the track above the finish line. By amplifying and recording the output of the cell and playing it back through the limiter 19 several times, with different adjustments of the limiter, it is possible to bring out contrasts between the white string and the white jerseys of the runners and thereby enable a determination as to which runner first touched the string.

I claim to have invented:

1. The method of photographing terrain as viewed from a moving aircraft comprising scanning the terrain from the aircraft by increments which are selected along a path that is at a predetermined angle to the path of flight of the aircraft, intermittently repeating the aforesaid scanning along paths parallel to the first one and successively displaced therefrom along the path of flight, generating a series of instantaneous electric potential differences of magnitudes respectively depending on the intensities of the light energies received from the increments being scanned, whereby to effect a pulsating electric potential wave varying according to the light energy, recording the pulsating electric potential wave at a recording rate proportional to the speed of the aircraft, playing back the recording, amplifying the played back recording by a step which amplifies the portions of the played back wave above a variable level more than those below such level, whereby to effect an amplified potential difference, varying said level to effect the desired degree of contrast in the resulting picture, moving the locus of said amplified potential difference relative to the picture being printed in a first direction at a speed proportional to the speed that the wave is played back and in a second direction at said predetermined angle to the first direction at a speed and repetition rate proportional to that scanning which is in the direction at said predetermined angle to the path of flight, and printing a picture depending on the locus and intensity of said amplified potential difference.

2. A picture recorder comprising a photoelectric cell, a cylindrical opaque container for the cell defining a single light opening which opening is in the form of a narrow slit in the side of the container and parallel to the axis of the cylinder, an outer opaque cylinder concentric with and adjacent to the first and defining a single narrow helical slit in its side wall which slit passes the first-named slit at an acute angle, means for rotating said outer cylinder about its axis, whereby at the intersections of said slits an opening is formed which moves parallel to the axis of the cylinders, an electrode comprising a raised metallic element of the same curvature as said second slit and mounted on the side of the outer cylinder at a predetermined angular displacement along the periphery of the outer cylinder from said second slit, a second fixed electrode comprising a metallic element located adjacent the first electrode and at said predetermined angular displacement from the first-named slit, means for amplifying the output of said cell and applying the amplified potential across said electrodes, and means for feeding chemically-treated paper between said electrodes.

3. The method of photography with improved contrast which includes scanning the object to be photographed, generating instantaneous potential differences varying with the incremental light intensities viewed during scanning, amplifying the resulting potential differences by amplifying those potential differences which exceed a variable selected value more than those potential differences that are below said value, varying said selected value to maintain it below the amplitude of the non-pulsating component of the varying potential differences created by the different scenes being photographed, moving said amplified potential difference relative to the picture being printed in a manner similar to movement of the scanning relative to the object being photographed, and printing increments of a picture with said amplified potential differences.

4. The method of photography which includes scanning the object to be photographed, generating a potential difference which varies according to the variation in intensity of the light received during scanning, recording the varying potential difference, playing back the recorded potential difference, amplifying the played-back potential, said amplifying step including amplifying those potentials above a variable selected level more than those below such level, raising said selected level when the minimum intensity of the light from the object photographed is large and lowering said selected level when the minimum intensity of the light from the object photographed is small, and printing a picture in accordance with resulting amplified potential difference.

5. The method of photographing terrain as viewed from a moving aircraft comprising scanning the terrain from the aircraft by increments which are selected along a path that is substantially perpendicular to the path of flight of the aircraft, intermittently repeating the aforesaid scanning along paths parallel to the first one and successively displaced therefrom along the path of flight, generating a series of instantaneous potential differences of magnitudes respectively depending on the intensities of the light energies received from the increments being scanned, whereby to effect a pulsating electric potential wave varying according to the light energy, recording the pulsating electric potential wave, playing back the recording, amplifying the played-back recording by a step which amplifies the portions of the wave above a selected amplitude more than those below such amplitude, printing a first picture with said amplified wave, and varying the aforesaid selected amplitude and printing a second picture with said variation in said selected amplitude, whereby pictures of different contrasts are produced; said steps of printing each including moving the locus of the amplified potential difference across the portions of the picture that respectively represent the scanned increments, and printing the picture in accordance with the variations in said amplified potential difference.

6. The method of photographing two closely adjacent objects, of different contrasts with respect to their backgrounds, from a moving aircraft, comprising scanning the objects and their backgrounds from the aircraft along predetermined paths, generating a series of instantaneous voltages respectively depending on the intensities of the light energies received from the increments being scanned, recording said voltages, twice playing back the recording, amplifying the output of the recording during the first time it is played back by a step which includes accentuating those portions of the played back wave which exceed the minimum intensity attributed to the first of the objects together with its background, amplifying the output of the recording during the second time it is played back by a step which includes accentuating those portions of the played back wave which exceed the minimum intensity attributed to the second of the objects together with its background, and printing two pictures respectively with the amplified voltages developed during the first and second times the recording was played back; each of said printings comprising moving the locus of the amplified voltage across the picture in accordance with the scanning pattern, and effecting chemical changes in the picture in accordance with the intensities and locus variations of said amplified voltage.

7. The method of photographing two closely adjacent objects, having different contrasts with respect to their backgrounds, from an aircraft, comprising scanning from the aircraft both of the objects together with their backgrounds, generating a series of potential differences which are respectively proportional to the several increments scanned, and printing two pictures from the resultant generated potential differences; the following acts being performed to print the first picture, limiting the potential differences to those above a selected value which value represents substantially the minimum potential difference generated by the light from the area close to and including the first of said objects, moving the locus of the limited potential difference relative to the first picture to be printed, and effecting a chemical change in the picture varying with the locus and intensity of the limited potential difference; the following acts being performed to print the second picture, limiting the potential differences to those above a second selected value which value represents substantially the minimum potential difference generated by the light from the area close to and including the second of said objects, moving the locus of the last-recited limited potential difference relative to the second picture to be printed and effecting a chemical change in the picture varying with the locus and intensity of the second-recited limited potential difference.

8. In a device for photography, a photoelectric cell, a scanner for exposing said cell to incremental spots of the object to be photographed according to a predetermined pattern, a limiter connected to said cell which removes the portions of the output wave form of the cell which are below a first selected value, another limiter connected to said cell which removes the portions of the wave form that are above a second selected value, said limiters comprising electron discharge devices each having a variable bias to control the said selected values respectively throughout a substantial portion of the amplitude of the output of the cell, a printer fed by said limited output, and a control element for moving the picture to be printed relative to the printer according to the scanning pattern.

9. In a device for photography, a photoelectric cell, a scanner for exposing said cell to incremental spots of the object to be photographed according to a predetermined pattern, a limiter connected to the output of said cell to remove all of the potential of the output thereof below a variable selected value, said limiter comprising an electron discharge device with a variable source of bias to bias the device to a non-conducting state for potentials below the selected value, a printer responsive to the output of the limiter, and a control element for moving the printer relative to the picture being printed according to the scanning pattern.

10. A picture recorder comprising a photoelectric cell, a cylindrical opaque container for the cell defining a single light opening which opening is in the form of a narrow slit in the side of the container and parallel to the axis of the cylinder, an outer opaque cylinder concentric with and adjacent to the first and defining a single narrow helical slit in its side wall which slit passes the first-named slit at an acute angle, means for rotating said outer cylinder about its axis, whereby at the intersections of said slits an opening is formed which moves parallel to the axis of the cylinders, an electrode comprising a raised metallic element of the same curvature as said second slit and mounted on the side of the outer cylinder at a predetermined angular displacement along the periphery of the outer cylinder from said second slit, a second fixed electrode comprising a metallic element located adjacent the first electrode, means for amplifying the output of said cell and applying the amplified potential across said electrodes, and means for feeding chemically-treated paper between said electrodes.

11. Apparatus adapted for photography from a moving aircraft comprising a photoelectric cell on the aircraft, scanning means for illuminating the cell according to the intensities of elements of terrain on a scanning path perpendicular to the path of flight, said scanning means including an opaque member interposed in the path of light to said cell, said member defining a narrow slit extending perpendicular to the path of flight of the aircraft and thereby limiting the width of the band of terrain scanned by each scanning sweep, a lens for focusing light from the terrain into said slit, printing means operated by the output of said cell for effecting printing action depending on the magnitude of the output of said cell; said printing means including a printing element and means for positioning the printing element relative to the picture being printed in accordance with the position of the scanning means with respect to the terrain at the time the impulse being printed was generated, an amplifier between the cell and the printing means, said amplifier including means to amplify certain portions of the wave received by it more than it amplifies other portions of said wave, and means associated with the amplifier for eliminating from the output thereof part of the non-pulsating component of the input wave.

References Cited in the file of this patent

UNITED STATES PATENTS

| | | |
|---|---|---|
| 1,540,318 | Dunajeff | June 2, 1925 |
| 1,776,097 | Baird | Sept. 16, 1930 |
| 2,212,969 | Finch | Aug. 27, 1940 |
| 2,223,431 | Smith | Dec. 3, 1940 |
| 2,235,550 | Fyler | Mar. 18, 1941 |
| 2,262,156 | Barnes | Nov. 11, 1941 |
| 2,288,871 | Adams | July 7, 1942 |
| 2,305,842 | Case | Dec. 22, 1942 |
| 2,313,543 | Hall | Mar. 9, 1943 |
| 2,356,361 | Sprague | Aug. 22, 1944 |
| 2,391,765 | Artzt | Dec. 25, 1945 |
| 2,419,024 | Iams | Apr. 15, 1947 |
| 2,423,885 | Hammond | July 15, 1947 |
| 2,458,654 | Southworth | Jan. 11, 1949 |
| 2,485,556 | Bion | Oct. 25, 1949 |
| 2,507,145 | Dean | May 9, 1950 |
| 2,510,200 | Thompson | June 6, 1950 |
| 2,538,065 | Wallace | June 16, 1951 |
| 2,545,463 | Hester | Mar. 20, 1951 |
| 2,548,436 | Loughren | Apr. 10, 1951 |

FOREIGN PATENTS

| | | |
|---|---|---|
| 364,489 | Italy | Nov. 7, 1938 |
| 477,355 | Great Britain | Dec. 28, 1937 |

OTHER REFERENCES

Television Equipment for Guided Missiles—Proceedings of the I. R. E. and Waves and Electrons, June 1946, pps. 375–401.